(12) United States Patent
An

(10) Patent No.: US 7,024,210 B2
(45) Date of Patent: Apr. 4, 2006

(54) METHOD FOR TRANSMITTING MESSAGE IN A MOBILE TERMINAL

(75) Inventor: Sung-Bin An, Kumi-shi (KR)

(73) Assignee: Samsung Electronics Co., Ltd., (KR)

( * ) Notice: Subject to any disclaimer, the term of this patent is extended or adjusted under 35 U.S.C. 154(b) by 579 days.

(21) Appl. No.: 09/974,380

(22) Filed: Oct. 10, 2001

(65) Prior Publication Data

US 2002/0107051 A1     Aug. 8, 2002

(30) Foreign Application Priority Data

Feb. 8, 2001    (KR) ................................. 2001-6220

(51) Int. Cl.
     *H04B 1/38*       (2006.01)
     *H04Q 7/14*       (2006.01)

(52) U.S. Cl. ...................... 455/466; 455/564; 455/566

(58) Field of Classification Search ............. 455/550.1, 455/564, 566, 414.4, 456.2, 460, 466; 379/352, 379/353, 354, 355.01, 355.02, 355.05, 355.06, 379/355.09, 356.01
See application file for complete search history.

(56) References Cited

U.S. PATENT DOCUMENTS

| | | | | |
|---|---|---|---|---|
| 5,535,258 A | * | 7/1996 | Joglekar et al. | ............ 455/564 |
| 5,878,397 A | * | 3/1999 | Stille et al. | ................. 455/466 |
| 5,920,826 A | * | 7/1999 | Metso et al. | ................. 455/557 |
| 6,044,278 A | * | 3/2000 | Goto et al. | .............. 455/422.1 |
| 6,278,886 B1 | * | 8/2001 | Hwang | ........................ 455/566 |
| 6,327,479 B1 | * | 12/2001 | Mikkola | ..................... 455/466 |
| 6,400,958 B1 | * | 6/2002 | Isomursu et al. | ........... 455/466 |
| 6,574,486 B1 | * | 6/2003 | Labban | ..................... 455/550.1 |
| 6,590,887 B1 | * | 7/2003 | Lee | ............................. 370/342 |
| 6,625,460 B1 | * | 9/2003 | Patil | ........................... 455/466 |

FOREIGN PATENT DOCUMENTS

| | | |
|---|---|---|
| CN | 1139868 A | 8/1997 |
| CN | 1264243 A | 8/2000 |
| JP | 05-183619 | 7/1993 |
| JP | 11-112639 | 4/1999 |
| JP | 2000-059529 | 2/2000 |

OTHER PUBLICATIONS

Chinese Office Action dated Oct. 10, 2003 issued in a counterpart application, namely, Appln. No. 01137572.8.

* cited by examiner

*Primary Examiner*—Binh K. Tieu
(74) *Attorney, Agent, or Firm*—Dilworth & Barrese, LLP

(57) ABSTRACT

A method for expedited transmission of a message from a mobile terminal wherein, if the mobile terminal user inputs a short message service (SMS) message into the mobile terminal when the mobile terminal requests that a mobile terminal user input a called party's phone number, the user is provided a means for expedited or speed-dialing of the called party's phone number, with the mobile terminal providing a calling party's phone number and providing means to automate entry of a called party phone number.

8 Claims, 4 Drawing Sheets

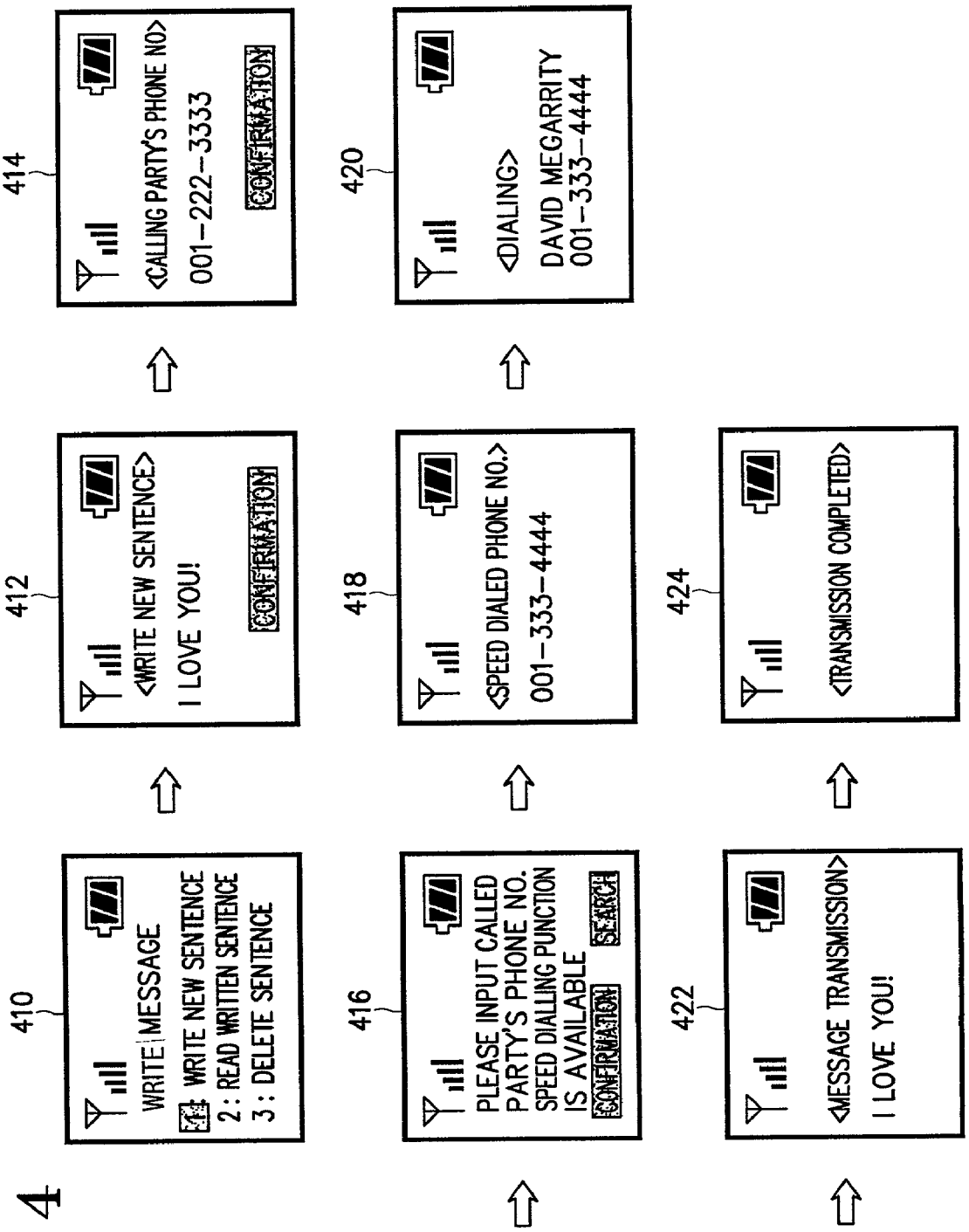

METHOD FOR TRANSMITTING MESSAGE IN A MOBILE TERMINAL

PRIORITY

This application claims priority to an application entitled "Method for Transmitting Message in a Mobile Terminal" filed in the Korean Industrial Property Office on Feb. 8, 2001 and assigned Serial No. 2001-6220, the contents of which are hereby incorporated by reference.

BACKGROUND OF THE INVENTION

1. Field of the Invention

The present invention relates generally to a message service method in a mobile terminal, and in particular, to a method for transmitting an SMS message in the mobile terminal.

2. Description of the Related Art

In general, a mobile terminal user can transmit a message such as a string of characters to a desired destination mobile terminal and can receive a similar message transmitted from other mobile terminals using a short message service (SMS) function, which is one of many functions the mobile terminal has in addition to a fundamental call function. The SMS function has accommodated a message service to mobile terminal users and is now becoming a universal function of mobile terminals.

If a mobile terminal user desires to transmit a message using the SMS function the mobile terminal user should input a called party's phone number and a calling party's phone number, as well as the desired transmission message, using a key input unit of the mobile terminal. In this case, since the calling party's phone number is typically the phone number of the mobile terminal itself, the user can input the calling party's phone number without difficulty, or the mobile terminal can automatically provide the required information, avoiding manual reentry of data. However, since the user is frequently not well acquainted with the called party's phone number, the user finds a great difficulty in inputting the called party's phone number.

SUMMARY OF THE INVENTION

It is, therefore, an object of the present invention to provide an improved message transmission method in a mobile terminal.

It is another object of the present invention to provide a method for enabling a mobile terminal user to rapidly and conveniently transmit a message in a mobile terminal.

It is further another object of the present invention to provide a method for conveniently inputting a called party's phone number when transmitting a message in a mobile terminal.

To achieve the above objects, there is provided a method for transmitting a message in a mobile terminal, which comprises the steps of requesting a mobile terminal user to input a called party's phone number when the mobile terminal user inputs a message into the mobile terminal; providing a speed-dialed phone number at a user's speed-dialing request for the called party's phone number; and transmitting the inputted message to a called mobile terminal corresponding to the speed-dialed phone number at a user's transmission request.

In addition, there is provided a method of message transmission for a mobile terminal which comprises the steps of requesting a mobile terminal user to input a calling party's phone number; requesting the mobile terminal user to input a called party's phone number if the mobile terminal user inputs the calling party's phone number; providing a speed-dialed phone number at a user's speed-dialing request for the called part's phone number; and transmitting the inputted message to a called mobile terminal corresponding to the speed-dialed phone number at a user's transmission request.

Furthermore, there is provided a method for message transmission for a mobile terminal when a mobile terminal user inputs a message into the mobile terminal that comprises the steps of: displaying on a display or screen of the mobile terminal a called party's phone number input requesting message, including information indicating that a message can be transmitted through a speed-dialing function, and determining whether the mobile terminal user has made a request out of a message transmission request after manual input of the called party's phone number, a speed-dialing function request for the called party's phone number and a called party's phone number search function request.

BRIEF DESCRIPTION OF THE DRAWINGS

The above and other objects, features and advantages of the present invention will become more apparent from the following detailed description when taken in conjunction with the accompanying drawings, in which:

FIG. 4 is a diagram showing exemplary step-by-step states of a mobile terminal screen that is displayed during a message transmission procedure according to an embodiment of the present invention.

DETAILED DESCRIPTION OF THE PREFERRED EMBODIMENT

The following detailed description of a preferred embodiment of the invention will be made in reference to the accompanying drawings. In describing the invention, explanation about related functions or constructions which are known to the art will be omitted for the sake of clearness in understanding the concept of the invention.

Figure 1:
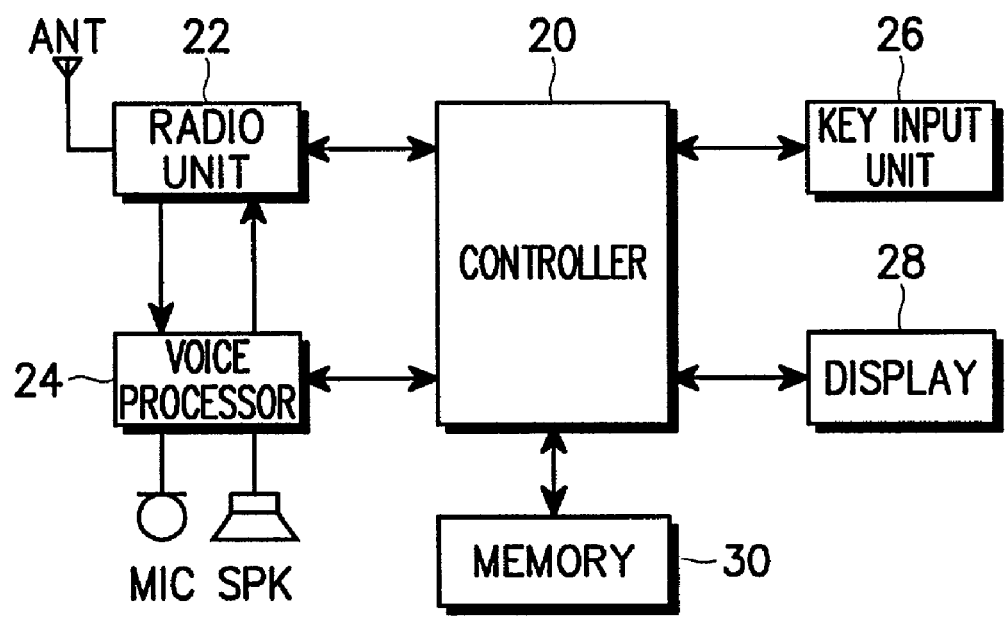
FIG. 1 is a schematic block diagram of a mobile terminal.

Referring to FIG. 1, a controller 20 controls an overall operation of the mobile terminal. A radio unit 22 controls transmission and reception of voice data and control data under the control of the controller 20. Under the control of the controller 20, a voice processor 24 converts through a speaker (SPK) the voice data received from the radio unit 22 into an audible sound and converts a voice signal received through a microphone (MIC) into voice data to output the converted voice data to the radio unit 22. A key input unit 26 includes numeral and function keys and outputs key input data corresponding to keys pressed by a mobile terminal user to the controller 20. A display 28 displays various messages under the control of the controller 20. A memory 30 includes a program memory for storing program data necessary for controlling an operation of the mobile terminal and a database for storing non-program data generated by the user or the controller 20. In an embodiment of the present invention that is not shown in FIG. 1, the database includes a phone number storage unit (i.e., a phone book) for storing a number of telephone numbers.

In an embodiment of the present invention, a called party's phone number can be manually input by a mobile terminal user or can be automatically input through a phone number search function, facilitating rapid and convenient transmitted. In addition, a message input by the user can be processed in an alternative expedited manner via a speed-dialing function (e.g., a one-touch dialing function) that automatically inputs the called party's phone number associated with a numeric function or other predefined key.

Figure 2:
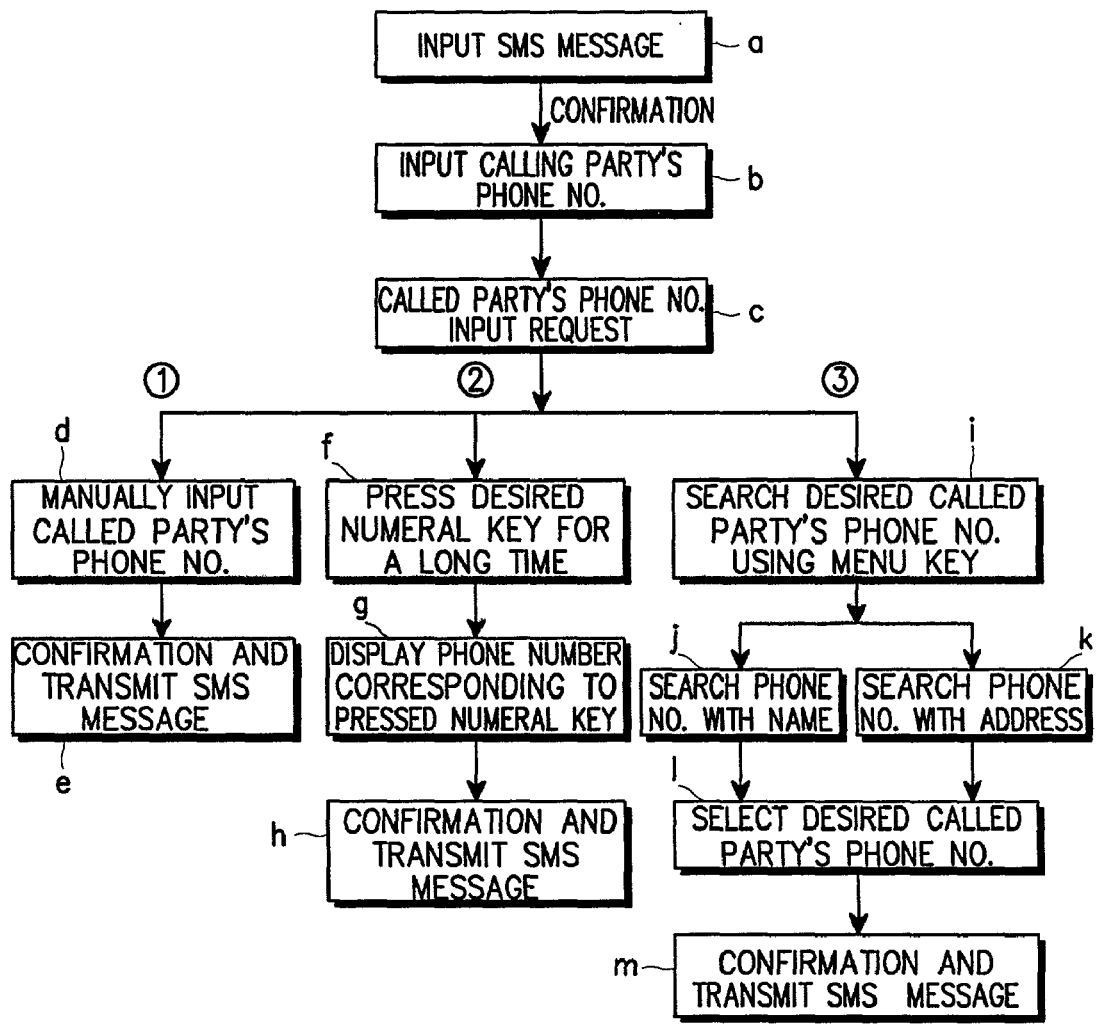
FIG. 2 is a flow chart illustrating, from the viewpoint of a mobile terminal user, a message transmission procedure according to an embodiment of the present invention.

FIG. 2 is a flowchart illustrating, from the standpoint of a mobile terminal user, a message transmission procedure according to an embodiment of the present invention.

Referring to FIG. 2, a mobile terminal user inputs the desired SMS message (Step a) and inputs a calling party's phone number (Step b), using the key input unit 26 of the mobile terminal. In this case, the calling party's phone number is typically a phone number that is assigned to the mobile terminal. Therefore, it is preferable that the controller 20 automatically display on the screen/display 28 the phone number of the mobile terminal as the calling party's phone number, allowing the user to simply select the displayed phone number (via touch screen or predefined numeric or function key) as the calling party's phone number, eliminating the need for separate manual input of the calling party's phone number. The controller 20 displays a request for input of the called party's phone number (Step c). The user then can transmit the short message to a called subscriber by one of three options. The first option is to manually input the called party's phone number, as shown in option (1) shown in FIG. 2. Alternatively, the user will be given the option of selecting one of the telephone numbers retrieved from the phone number storage unit of the memory 30, according to options (2) or (3), as shown in FIG. 2.

A description will now be made of a fundamental difference between the options (2) and (3) and the conventional message transmission method. In the conventional message transmission method, after a SMS message is input by the user, a called party's phone number is input, followed by a calling party's phone number. However, in each of the three message transmission options (1), (2) and (3) described in FIG. 2, the called party's phone number is input after input of the calling party's phone number, allowing input of the called party's phone number through either a phone number search function or through a speed-dialing function.

The message transmission methods (1), (2) and (3) will now be described in greater detail. In the first message transmission method (1) being identical to the conventional message transmission method, the mobile terminal user manually inputs the called party's phone number (Step d)and then transmits the SMS message input in Step a by pressing a confirmation key (Step e).

In the second message transmission method (2), the input SMS message is transmitted to the called mobile terminal in an expedited manner through a speed-dialing function. The speed-dialing function (Step f) will recognize if the mobile terminal user presses a predefined the function or numeral key for an extended time (i.e. longer than the user's normal keystroke time), and the controller 20 will respond to the extended keystroke by displaying on the screen/display 28 a telephone number associated with an address corresponding to the predefined key as a called party's phone number (Step g). The user then confirms the displayed phone number as the desired called party's phone number and the controller 20 transmits the inputted SMS message to the called mobile terminal (Step h).

In the third message transmission method (3), the mobile terminal user utilizes the phone number search function to locate and input the desired called party's phone number, typically accessing the function via a menu key on the key input unit 26 (Step i). The desired called party's phone number can be searched by name (Step j) or can be searched by address (Step k). Once the user locates the desired called party's phone number (through wither step j or k), the user will select the desired number (Step l) and the controller 20 will transmit the SMS message once the user confirm the selected number (Step m). It will be appreciated that steps l and k can be combined pursuant to the user's preference.

Figure 3:
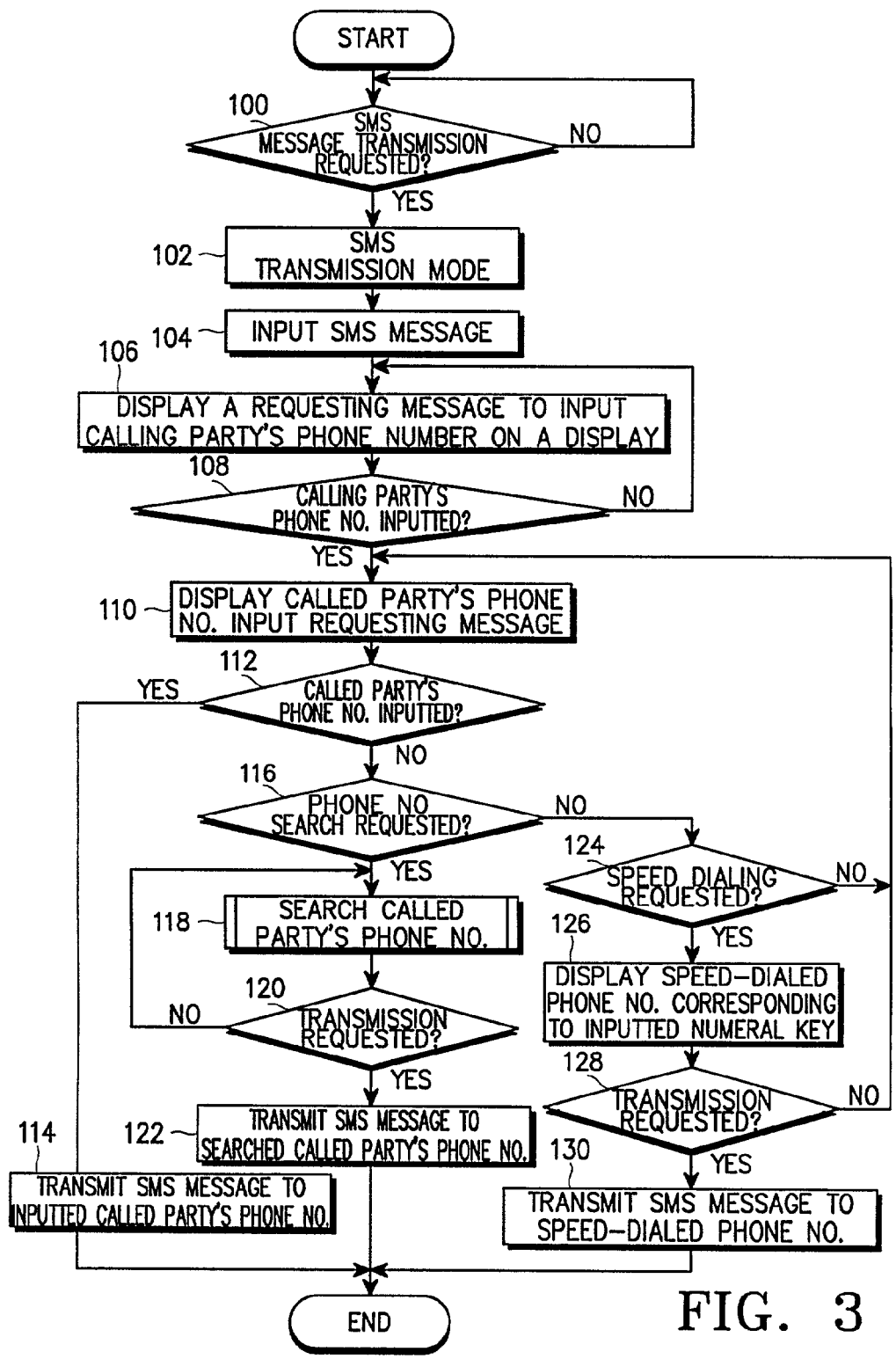
FIG. 3 is a flow chart illustrating a procedure for controlling message transmission in a mobile terminal, according to an embodiment of the present invention.

FIG. 3 is a flowchart illustrating a procedure for controlling message transmission in a mobile terminal, according to an embodiment of the present invention. FIG. 4 shows exemplary step-by-step states of a mobile terminal screen displayed during a message transmission procedure according to an embodiment of the present invention.

Referring initially to FIG. 3, the controller 20 determines whether a mobile terminal user has requested message transmission using a menu key of the key input unit 26 (Step 100 of FIG. 3). If the mobile terminal user has requested message transmission, the controller 20 proceeds to step 102, entering short message transmission mode. The mobile terminal user then writes a short message through a user interface (Step 104). A screen state represented by reference numeral 410 of FIG. 4 corresponds to a case where the controller 20 has entered the short message transmission mode in step 102, displaying a situation where the user selects item "1: WRITE NEW SENTENCE". A screen state represented by reference numeral 412 of FIG. 4 corresponds to a case where the short message has been written in step 104.

After the mobile terminal user finishes writing (i.e., has input) the desired SMS message in step 'a' of FIG. 2, the user will then press a confirmation key, and the controller 20 proceeds to step 106, in FIG. 3. In step 106, the controller 20 displays on the display 28 a calling party's phone number. It will be appreciated that the mobile terminal can be designed so that the controller 20 will display on the display 28 a phone number of the mobile terminal as the calling party's phone number, simplifying the task by requiring the user only to confirm the displayed phone number as the calling party's phone number or to manually input the calling party's phone number. Another alternative mobile terminal design is to program a speed-dial function to accept, without further user input or action, the phone number of the mobile terminal as the calling party's phone number.

A screen state represented by reference numeral 414 of FIG. 4 corresponds to a screen state of a case where the calling party's phone number has been automatically displayed in step 106 and the controller awaits user confirmation or entry of an alternative calling party's phone number. In the screen state represented by reference numeral 414, a default value, "001-222-3333" is displayed as the calling party's phone number. However, the user can manually input a different phone number as the calling party's phone number.

If the controller 20 determines, in step 108, that the user inputted the calling party's phone number and has pressed a confirmation key, the controller 20 proceeds to step 110 to display on the display 28 a called party's phone number input requesting message. Step 110 corresponds to step c of FIG. 2. For example, the controller displays on the display 28 a guidance message, "PLEASE INPUT CALLED PARTY'S PHONE NUMBER. SPEED-DIALING FUNCTION IS ALSO AVAILABLE.", as shown by reference numeral 416 of FIG. 4. The user then inputs the called party's phone number to request message transmission, using one of the three previously-described message transmission options (1), (2) and (3).

If the mobile terminal user has manually input the called party's phone number and has requested message transmission by pressing a confirmation key, according to the first message transmission method (1), the controller 20 perceives this fact (Step 112) and proceeds to step 114. In step 114, the controller 20 transmits the short message written in step 104 to a mobile terminal corresponding to the called party's phone number manually inputted by the user.

If the mobile terminal user has requested a speed-dialing operation by pressing a predefined key for a time period longer than a normal key-pressing time, the controller 20 will recognize that the second message transmission option (2) has been selected (Step 124) and will proceed to step 126. Of course, the speed-dialing function requires that the user know the predefined speed-dialing called party's phone number that corresponds to each programmed key. In step 126, the controller 20 displays on the display 28 the speed-dialed phone number corresponding to the selected key (See a screen state represented by reference numeral 418 of FIG. 4). Thereafter, if the user confirms the speed-dial number and requests transmission of the inputted SMS message step 128, the controller 20 proceeds to step 130 and transmits the SMS message to a mobile terminal corresponding to the displayed speed-dialed called party phone number. Screen states represented by reference numerals 418, 420, 422 and 424 of FIG. 4 correspond to screen states displayed when steps 126 and 130 of FIG. 3 are performed, showing a case where an inputted short message is transmitted to a mobile terminal corresponding to a displayed speed-dialed called party phone number.

If the mobile terminal user has requested a phone number search operation by pressing a search key (or search icon) illustrated in a screen represented by reference numeral 416 of FIG. 4, according to the third message transmission method (3), the controller 20 perceives this fact (Step 116 of FIG. 3) and proceeds to step 118. In step 118, the controller 20 searches a desired called party's phone number from among a plurality of phone numbers stored in the phone number storage unit, preferably using a user interface. The desired called party's phone number can be searched with a name (Step j of FIG. 2) or can be searched with an address (Step k of FIG. 2). Once the user finds the desired called party's phone number and presses a confirmation key (or confirmation icon) (Step l of FIG. 2), the user requests the controller 20 to transmit the SMS message to a mobile terminal corresponding to the searched called party's phone number, by pressing the confirmation key. The controller 20 perceives this fact (Step 120), proceeds to step 122, and transmits the SMS message to a mobile terminal corresponding to the searched called party's phone number.

As described above, the present invention enables a mobile terminal user to conveniently transmit an inputted short message to a called mobile terminal through a speed-dialing function. In addition, the mobile terminal user can rapidly transmit the inputted short message to the called mobile terminal through phone number search functions.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for expedited transmission of a message from a mobile terminal, comprising the steps of:
   requesting input by a mobile terminal user of a called party's phone number, after the mobile terminal user inputs a message to be sent using a short message service (SMS) into the mobile terminal and inputs a calling party's phone number;
   providing to the user, from a database containing a plurality of called party phone numbers, a called party phone number at a user's speed-dialing request for the called party's phone number;
   automatically providing to the mobile terminal the called party phone number and the message; and
   transmitting the message to a called mobile terminal corresponding to the called party phone number selected by the user.

2. The method as claimed in claim 1, wherein the mobile terminal user makes a speed-dialing request by pressing a predefined key for a time period longer than a normal key-pressing time.

3. The method as claimed in claim 1, wherein the message is in short message service (SMS) format.

4. A method for transmitting a message in a mobile terminal, comprising the steps of:
   requesting input by the mobile terminal user of a calling party's phone number after the mobile terminal user inputs a message to be sent using a short message service (SMS) into the mobile terminal;
   requesting input by the mobile terminal user of a called party's phone number;
   providing at a user's speed-dialing request for the called party's phone number a called party phone number from a database containing a plurality of called party phone numbers;
   speed-dialing the called party phone number; and
   transmitting the message to a called mobile terminal corresponding to the speed dialed phone number selected by the user.

5. The method as claimed in claim 4, wherein the mobile terminal user inputs a message into the mobile terminal.

6. The method as claimed in claim 4, wherein the mobile terminal user inputs the calling party's phone number.

7. A method for transmitting a message in a mobile terminal, comprising the steps of:
   displaying on a display a called party's phone number input requesting message including information indicating that a message can be transmitted through a speed-dialing function, after the mobile terminal user inputs a message to be sent using a short message service (SMS) into the mobile terminal and inputs a calling party's phone number; and
   determining whether the mobile terminal user has made a message transmission request following manual input of the called party's phone number; and
   speed-dialing a function request for the called party's phone number and a called party's phone number search function request.

8. The method as claimed in claim 7, wherein the mobile terminal user inputs a message into the mobile terminal.

* * * * *